(12) United States Patent
Moore et al.

(10) Patent No.: US 10,155,465 B2
(45) Date of Patent: Dec. 18, 2018

(54) COLLAPSIBLE CARGO BOX

(71) Applicant: Nivel Parts & Manufacturing Co., LLC, Jacksonville, FL (US)

(72) Inventors: Brent Moore, Tallahassee, FL (US); Cody Baggett, Jacksonville, FL (US); Benjamin E. Donovan, Thomasville, GA (US)

(73) Assignee: Nivel Parts & Manufacturing Co., LLC, Jacksonville, FL (US)

( * ) Notice: Subject to any disclaimer, the term of this patent is extended or adjusted under 35 U.S.C. 154(b) by 0 days.

(21) Appl. No.: 15/162,694

(22) Filed: May 24, 2016

(65) Prior Publication Data

US 2017/0341591 A1 Nov. 30, 2017

(51) Int. Cl.
*B60P 1/00* (2006.01)
*B60R 9/06* (2006.01)
*B65D 6/00* (2006.01)

(52) U.S. Cl.
CPC ...... *B60P 1/00* (2013.01); *B60R 9/06* (2013.01); *B65D 11/00* (2013.01)

(58) Field of Classification Search
CPC . A63B 55/61; B65D 9/18; B65D 7/32; B65D 7/30; B65D 7/24; B65D 7/28; B65D 11/1893; B65D 11/1873; B65D 11/1866; B65D 11/18; B65D 11/00; B65D 7/12; B65D 7/00; B65D 7/26; B60R 2011/0082; B60R 9/06; B60P 1/00
USPC .............. 224/274, 314, 42.34, 549; D12/16
See application file for complete search history.

(56) References Cited

U.S. PATENT DOCUMENTS

| 1,642,381 | A | * | 9/1927 | Moyer | B65D 7/26 217/14 |
| 3,138,307 | A | * | 6/1964 | Priban | B60R 9/055 224/328 |
| D292,899 | S | * | 11/1987 | Samuelson | D12/15 |
| 5,429,290 | A | | 7/1995 | Greene, Jr. | |
| 5,480,180 | A | | 1/1996 | Fuller et al. | |
| 6,202,884 | B1 | * | 3/2001 | Verkerke | B65D 11/18 206/583 |
| 6,378,893 | B1 | | 4/2002 | Jager | |
| 6,752,285 | B1 | * | 6/2004 | Scalf | B65D 11/1873 220/1.5 |
| 8,414,052 | B2 | | 4/2013 | Vertanen | |
| 2005/0264048 | A1 | | 12/2005 | Collins | |
| 2006/0065792 | A1 | * | 3/2006 | Valin | A63B 55/61 248/96 |

* cited by examiner

Primary Examiner — Scott McNurlen
(74) Attorney, Agent, or Firm — Mark Young, P.A.

(57) ABSTRACT

Methods and apparatus for providing a collapsible cargo box. The cargo box include a left wall having a tongue at the rearmost portion and a tongue at the bottom, a right wall having a tongue at the rearmost portion and a tongue at the bottom, a rear wall having a tongue at the leftmost portion, the rightmost portion and the bottom, a base and a tailgate. The method may include sliding the tongue at the bottom of the left wall into a first groove in the base, sliding the tongue at the bottom of the rear wall into a second groove in the base, sliding the tongue at the bottom of the right wall into a third groove in the base, rotatably coupling the tailgate to the base, coupling the left wall to the rear wall and coupling the right wall to the rear wall.

12 Claims, 7 Drawing Sheets

COLLAPSIBLE CARGO BOX

FIELD OF TECHNOLOGY

This disclosure relates to cargo boxes for mounting on the rear portion of an open vehicle. More particularly, this disclosure relates to cargo boxes for mounting on the rear portion of a golf cart.

BACKGROUND OF THE DISCLOSURE

Conventionally, cargo boxes may be mounted on the backs of open-backed vehicles such as golf carts, all-terrain vehicles (ATVs) or other utility vehicles.

However, cargo boxes are notoriously bulky. Accordingly, they can be very difficult and cumbersome to ship. In addition, because of the location of the boxes—i.e., on the rear portion of a golf cart or other open vehicle—the cargo boxes are subject to large amounts of vibration. Also, the stress applied by additional weight of cargo to the cargo box tends to exacerbate dilatory effects of the vibration.

It would be desirable to provide a collapsible cargo box kit that, prior to being deployed, reduces the amount of volume required to ship the cargo box.

It would further be desirable to provide a collapsible cargo box that, even under increased stress of cargo, maintains its structural integrity substantially absent the dilatorious effects of increased vibration.

SUMMARY OF THE DISCLOSURE

Methods and apparatus for providing a collapsible and/or collapsible cargo box are provided. The collapsible cargo box may include a left wall, having a tongue at the bottom of the wall, a right wall having a tongue at the bottom of the wall, a rear wall having a tongue at the bottom of the rear wall and a base. The base may include a first groove for accommodating the tongue at the bottom of the left wall, a second groove for accommodating the tongue at the bottom of the right wall, and a third groove for accommodating the tongue at the bottom of the rear wall. The box may further include a tailgate. The tailgate may include a bottom portion rotatably coupled to the base. The box may further include a left corner post. The left corner post may include a first groove for accommodating the tongue at the rearmost portion of the left wall and a second groove for accommodating the tongue at the leftmost portion of the rear wall. The box may yet further include a right corner post. The right corner post may include a first groove for accommodating the tongue at the rearmost portion of the right wall and a second groove for accommodating the tongue at the rightmost portion of the rear wall.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
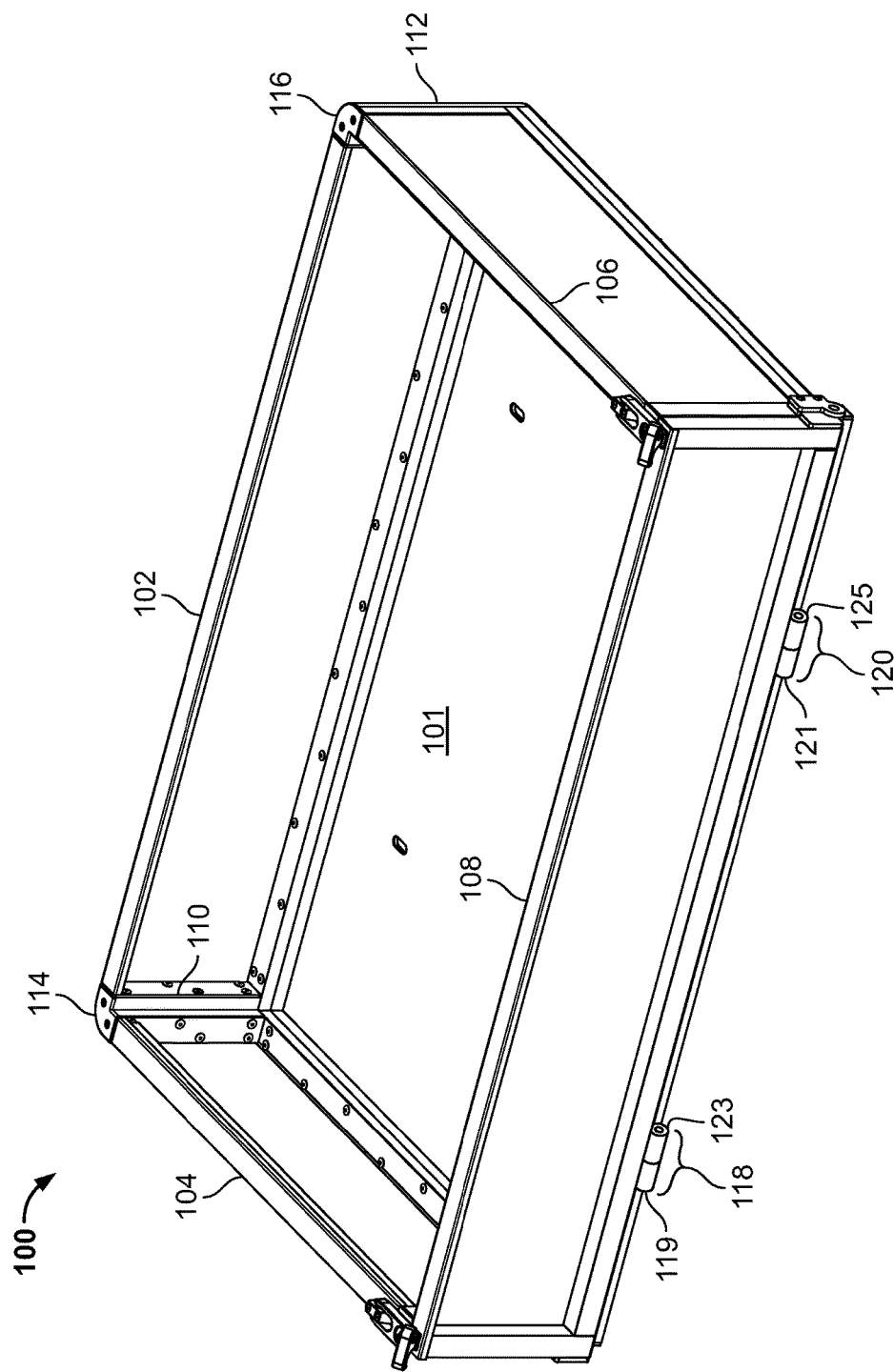
FIG. 1 shows a front, right, elevational view of a collapsible cargo box according to some embodiments.

A collapsible cargo box is provided. The collapsible cargo box may include a left wall, having a tongue at the rearmost portion of the left wall and a tongue at the bottom of the wall. The collapsible cargo box may also include a right wall having a tongue at the rearmost portion of the right wall and a tongue at the bottom of the wall. The collapsible cargo box may also include a rear wall having a tongue at the leftmost portion of the rear wall, the rightmost portion of the rear wall and the bottom of the rear wall. In addition, the collapsible cargo box may include a base.

The base may include a first groove for accommodating the tongue at the bottom of the left wall, a second groove for accommodating the tongue at the bottom of the right wall, and a third groove for accommodating the tongue at the bottom of the rear wall.

The collapsible cargo box may also include a tailgate. The tailgate may include a bottommost portion rotatably coupled to the base. The tailgate may include a left coupling mechanism. The left coupling mechanism may be used for coupling the left wall and the rear wall. The collapsible cargo box may also include a right coupling mechanism. The right coupling mechanism may couple the right wall and the rear wall.

In certain embodiments, the tailgate may be rotatably coupled to the base by a plurality of hinges. In some embodiments, the tailgate may be removably coupled to the base by a plurality of hinges.

The left coupling mechanism may include, in certain embodiments, a left corner post. The left corner post may include a first groove for accommodating a tongue at the rearmost portion of the left wall and a second groove for accommodating a tongue at the leftmost portion of the rear wall. The left corner post may be capped by a removable post cap.

The right coupling mechanism, in some embodiments, may include a right corner post. The right corner post may include a first groove for accommodating a tongue at the rearmost portion of the right wall and a second groove for accommodating a tongue at the rightmost portion of the rear wall. The right corner post may be capped by a removable post cap.

Certain embodiments of the invention may include a plurality of box supports for supporting the collapsible cargo box on the back of a golf cart.

Certain embodiments of the invention may also include a plurality of tailgate locks for locking the tail gate in an upright position. The tailgate locks may be formed from one or more latches located on the box and one or catches located on the tailgate. The catches may preferably engage the latches. In some embodiments, a first of the plurality of tailgate locks is configured to lock a leftmost side of the tailgate to the left wall and a second of the plurality of tailgate locks is configured to lock a rightmost side of the tailgate to the right wall.

Illustrative embodiments of mechanism and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of mechanism and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, or structures.

FIG. 1 shows a front, right, elevational view of a collapsible cargo box 100 according to some embodiments. FIG. 1 includes a base 101 (which includes apertures, the apertures which are shown and numbered in FIG. 6, for mounting to a bracket that is attached to a golf cart or other vehicle), a back wall 102, a left wall 104 and a right wall 106.

Left wall 104 is coupled to base 101. Left wall 104 is also coupled to back wall 102 via corner piece 110. Right wall 106 is coupled to base 101. Right wall 106 is coupled to back wall 102 via corner piece 112. Corner piece 110 is preferably capped with cap 114. Corner piece 112 is preferably capped with cap 116. Details of the various couplings are set forth in more detail in FIGS. 3-5 and the portions of the written specification corresponding thereto.

FIG. 1 also includes a liftgate 108. Liftgate 108 is preferably hingedly coupled to left wall 104 and base 101 at a first corner, and preferably hingedly coupled to right wall 106 and base 101 at a second corner.

Figure 2:
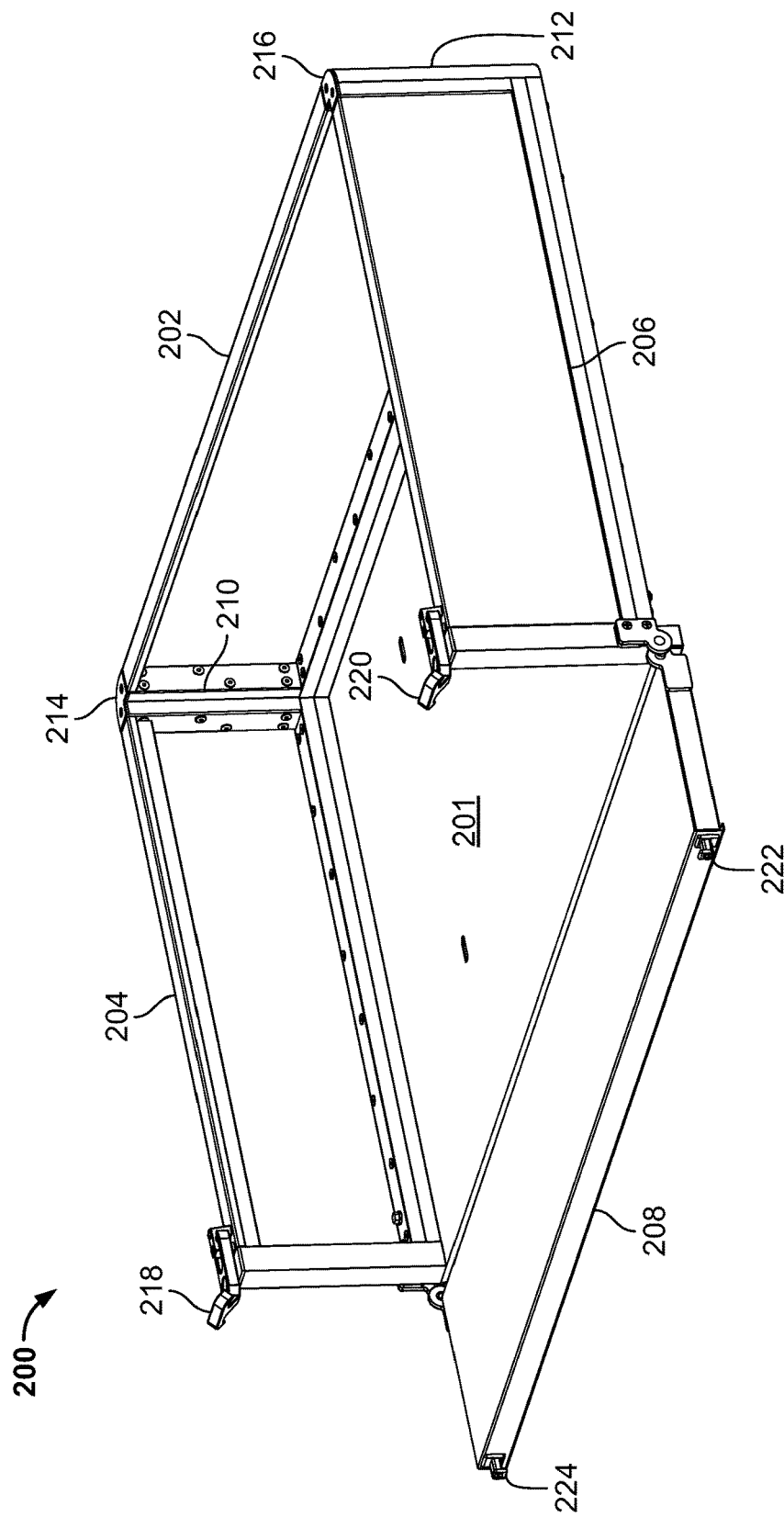
FIG. 2 shows a front, right, elevational view of a collapsible cargo box, with an open tailgate, according to some embodiments.
Figure 5:
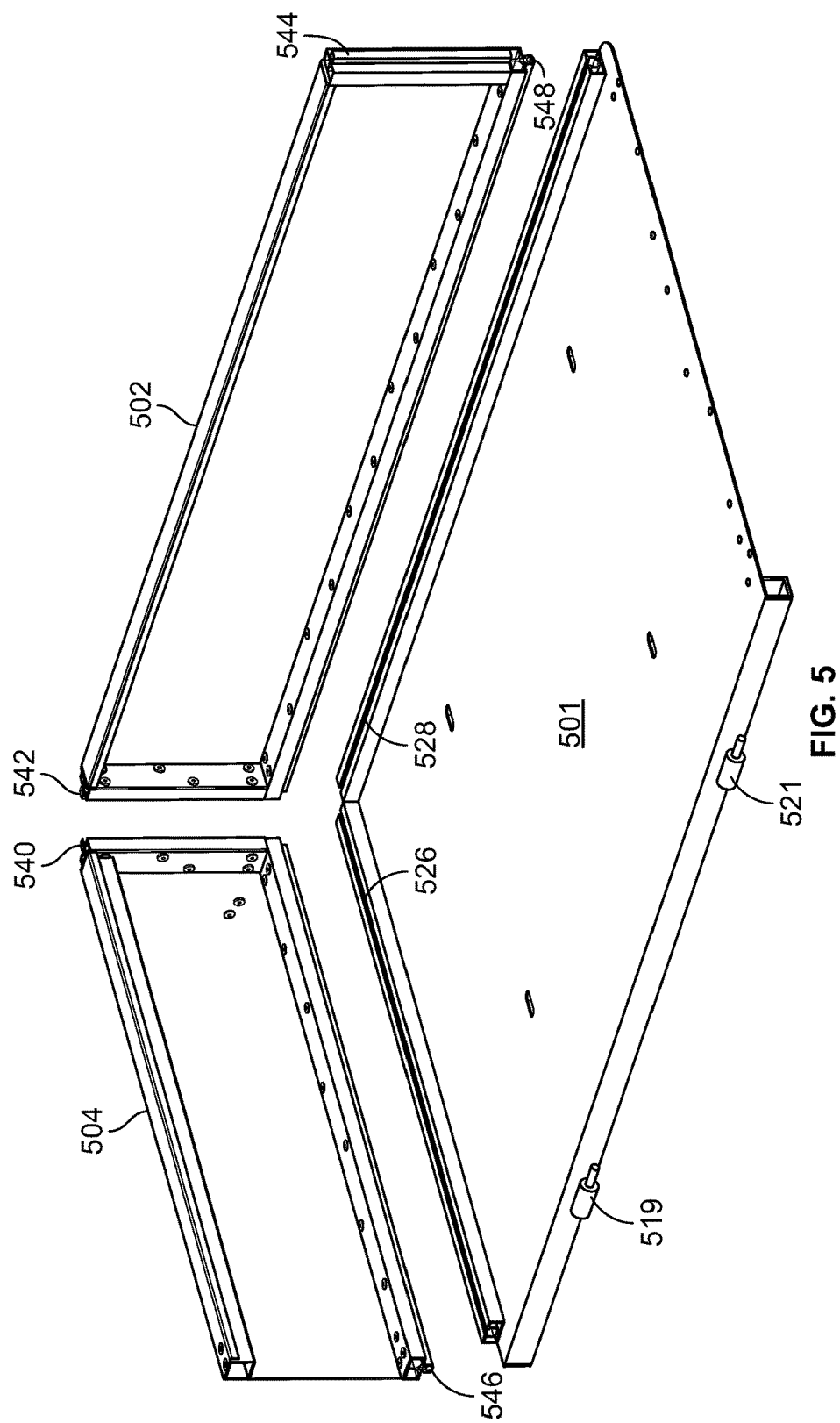
FIG. 5 shows a partial, exploded view of a collapsible cargo box according to some embodiments.
Figure 7:
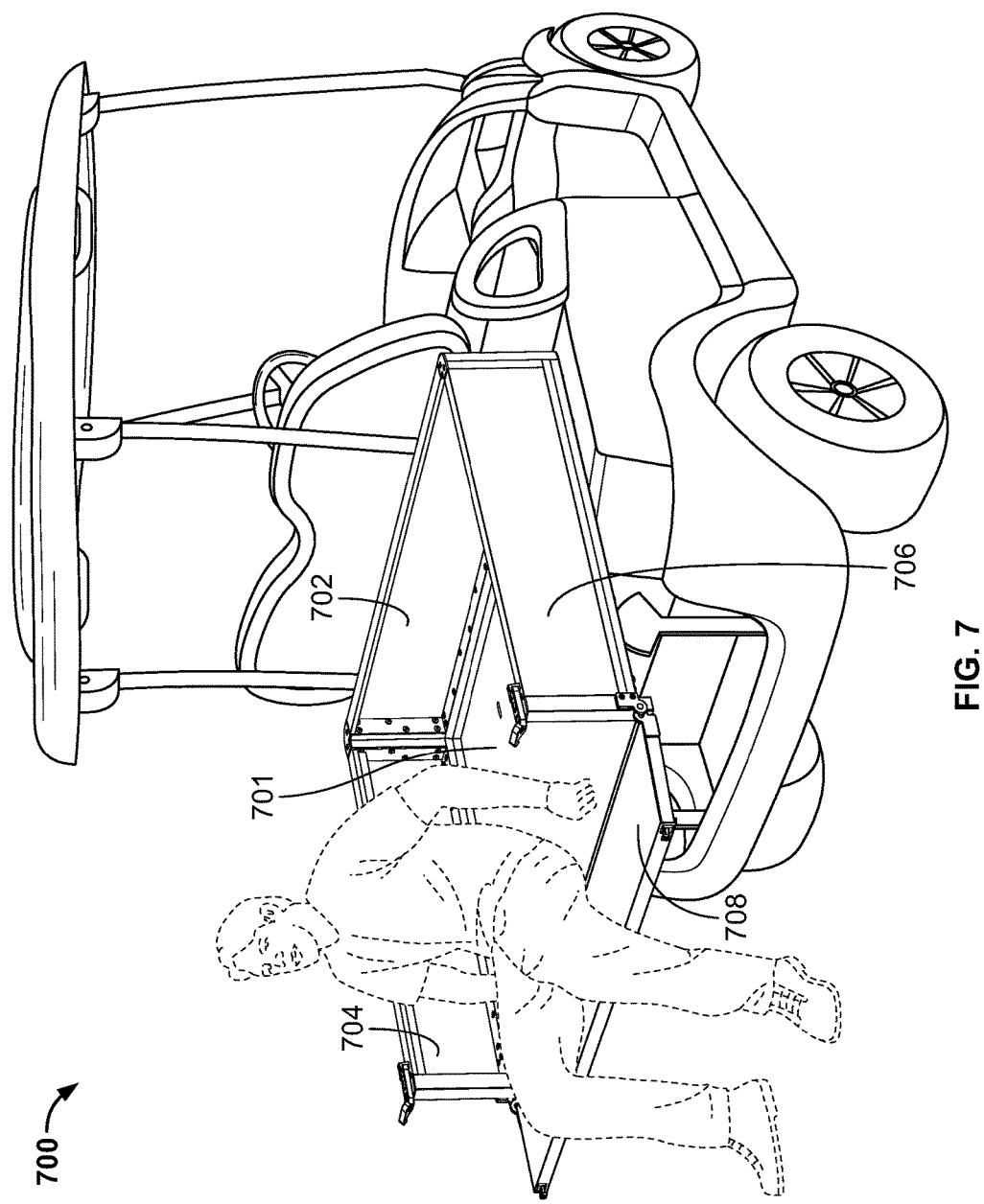
FIG. 7 shows a front, right, elevational view of collapsible cargo box, with an open tailgate, and certain environmental objects, according to some embodiments.

In certain embodiments, liftgate 108 may be configured to lay flat when in an open position (as shown in FIGS. 2 and 7). Brackets 118 and 120 preferably stabilize and support liftgate 108 when liftgate 108 lays flat. Bracket 118 may preferably be formed from a female portion 123 and a male portion 119. Bracket 120 may preferably be formed from a female portion 125 and a male portion 121. It should be noted that, while FIGS. 1, 3 and 5 show brackets coupling liftgate 108 to the base, it should be noted that any suitable stabilizing device may preferably be used to stabilize liftgate 108.

FIG. 2 shows a front, right, elevational view of a collapsible cargo box 200, with an open tailgate 208, according to some embodiments. FIG. 2 shows back wall 202, left wall 204, right wall 206, a base, corner piece 210, cap 214, corner piece 212 and cap 216.

FIG. 2 also shows in more detail tailgate catches 218 and 220. Each of tailgate catches 218 and 220 are configured to engage with each of latches 224 and 222, respectively. Tailgate catches 218 and 220 may work together with latches 224 and 222 to maintain liftgate 208 in a closed condition—i.e., perpendicular to the base 201.

Figure 3:
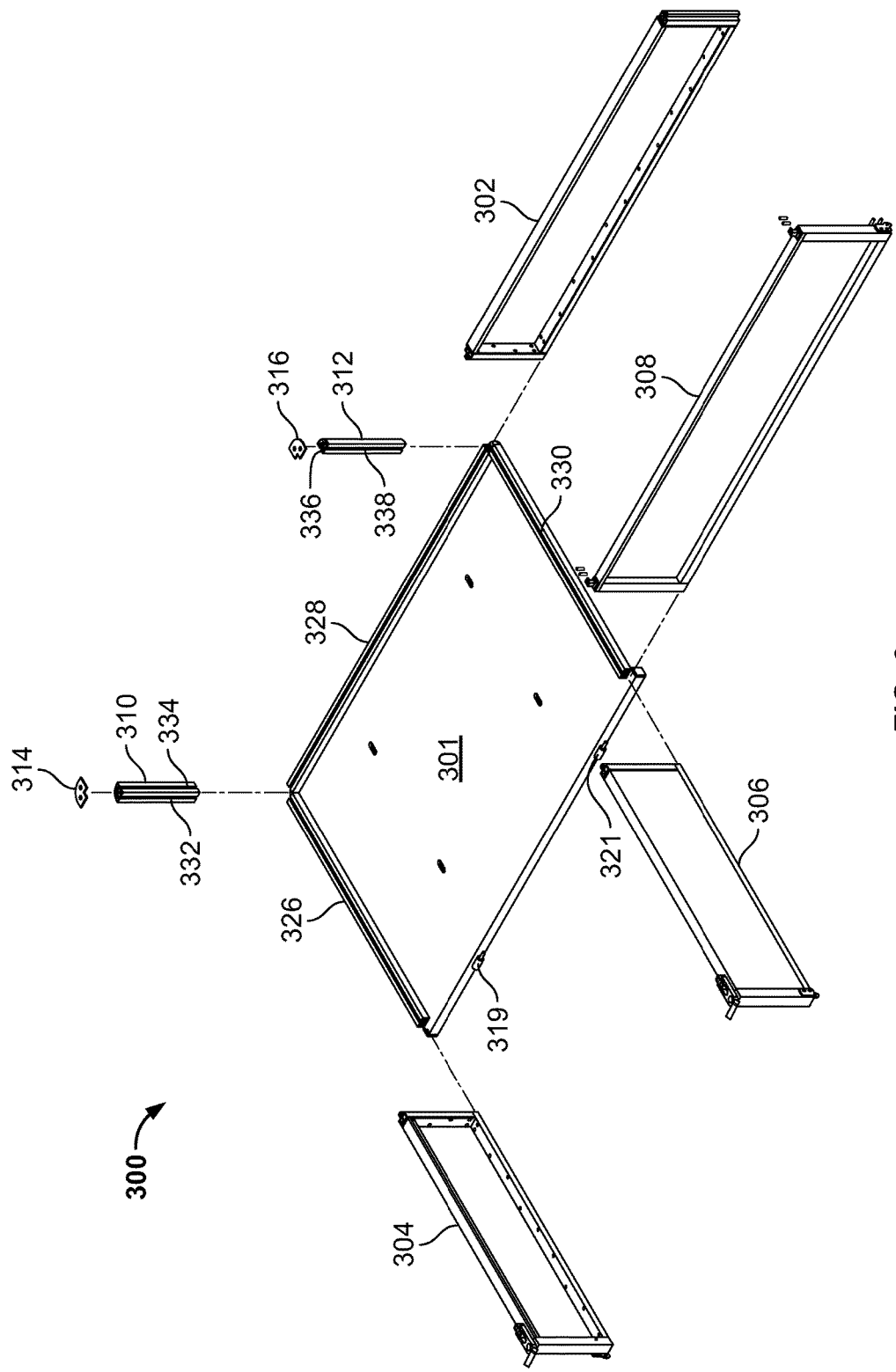
FIG. 3 shows an exploded view of a collapsible cargo box according to some embodiments.

FIG. 3 shows an exploded view of a collapsible cargo box 300 according to some embodiments. FIG. 3 shows base 301, back wall 302, left wall 304, right wall 306, liftgate 308, corner pieces 310 and 312, corner caps 314 and 316, brackets 319 and 321, grooves 326, 328, 330, 332, 334, 336, and 338. Tongues for insertion in grooves 326, 328, 330, 332, 334, 336, and 338 are shown in more detail in FIGS. 4 (440 and 442) and FIGS. 5 (540, 542, 544, 546, and 548) and which tongues fit into which grooves will be explained below.

Figure 4:
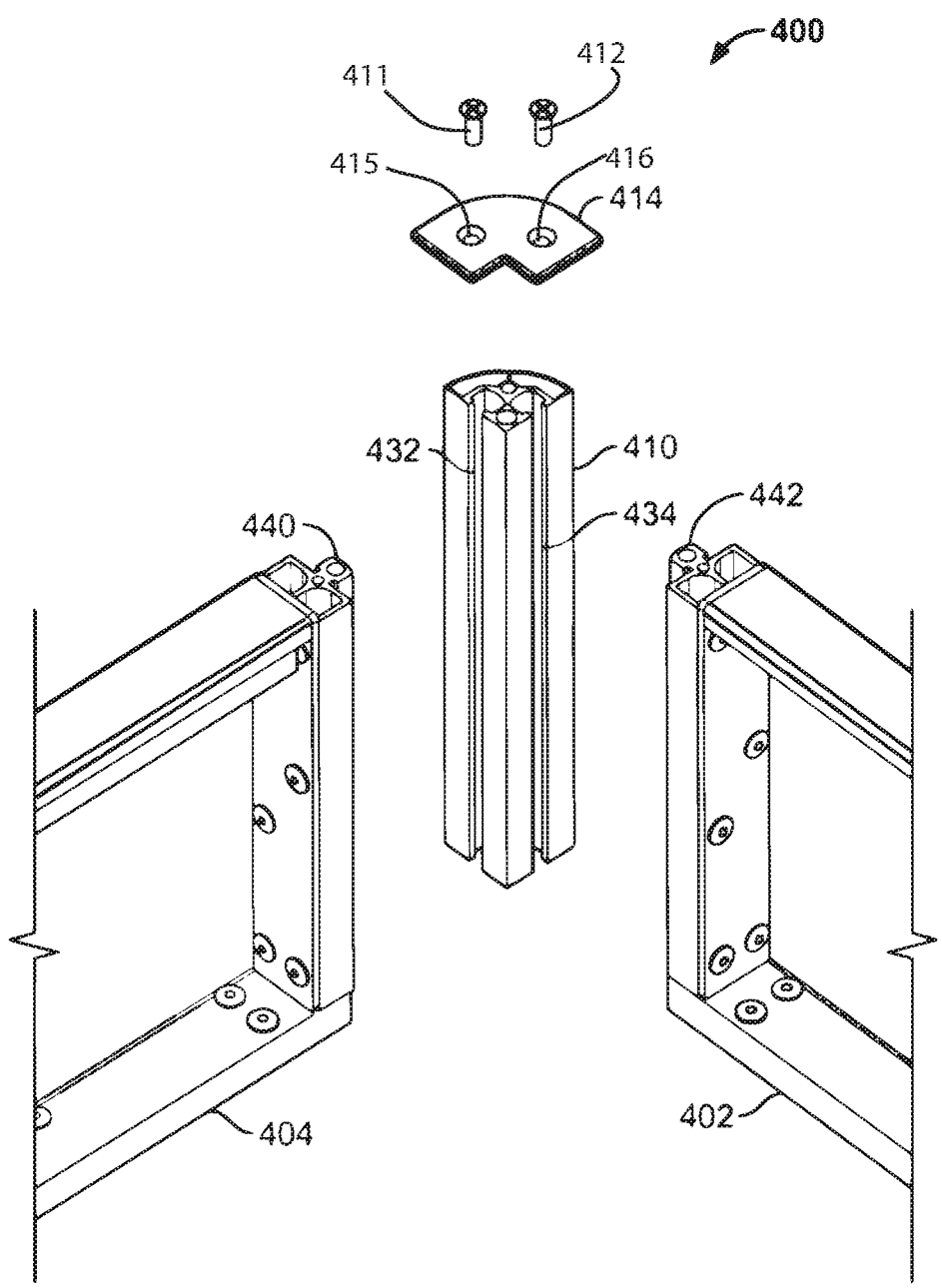
FIG. 4 shows an enlarged, exploded view of a corner of a collapsible cargo box according to some embodiments.

FIG. 4 shows an enlarged, exploded view of a corner 400 of a collapsible cargo box according to some embodiments. Corner 400 is formed from back wall 402 and side wall 404. Back wall 402 includes tongue 442. Left wall 404 includes tongue 440. Corner 400 also includes corner piece 410. Corner piece 410 is capped by cap 414, with screws 411, 412 extending through holes 415, 416 into tongues 440, 442.

Tongue 440 is preferably configured to fit into groove 432. Tongue 442 is preferably configured to fit into groove 434. Corner piece 312 (shown in FIG. 3) preferably includes grooves 336 and 338 which are configured to receive tongues from back wall 302 and side wall 306.

FIG. 5 shows a partial, exploded view of a collapsible cargo box according to some embodiments. The portion of the collapsible cargo box shown in FIG. 5 includes base 501, back wall 502, left wall 504, brackets 519 and 521, grooves 526 and 528, and tongues 546 and 548.

Tongue 546 is preferably be configured to engage groove 526 and tongue 548 is preferably configured to engage groove 528. It should be noted that the right wall (not shown in FIG. 5) also preferably includes a tongue for engaging groove 544 shown in back wall 502 and a tongue for engaging a groove in base 501.

Figure 6:
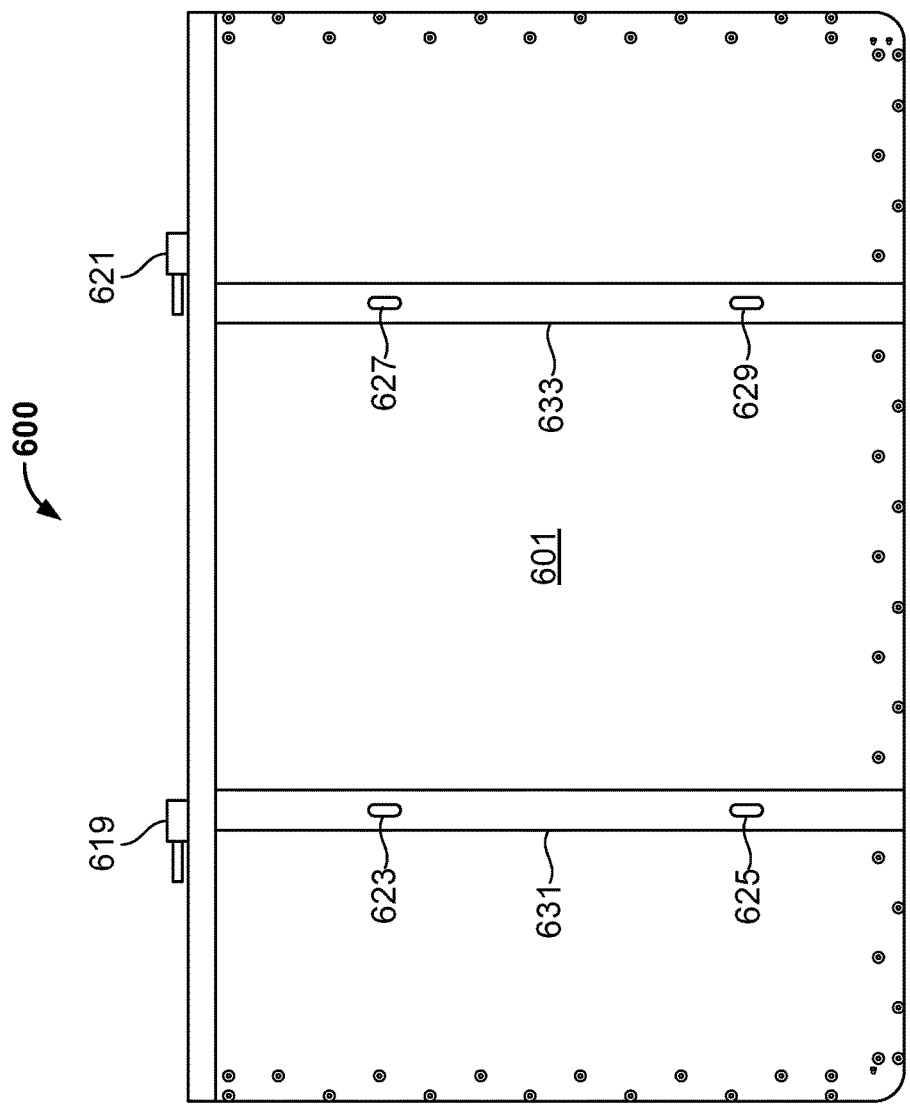
FIG. 6 shows a bottom plan view of a base of a collapsible cargo box according to some embodiments.

FIG. 6 shows a top plan view of a base 601 of a collapsible cargo box 600 according to some embodiments. Base 601 preferably includes male portions of brackets 619 and 621 for mating with female portions of brackets mounted on the liftgate shown in FIGS. 1, 2, 3 and 7. FIG. 6 also shows apertures 623, 625, 627 and 629. Apertures 623, 625, 627 and 629 preferably may be utilized to secure base 601 to mounting brackets attached to a golf cart or other vehicle. FIG. 6 also includes optional supports 631 and 633. Supports 631 and 633 may provide additional support to base 601. It should be noted that, in preferred embodiments, apertures 623, 625, 627 and 629 may preferably be punched through supports 631 and 633 in order to provide additional purchase for bolts affixed through apertures 623, 625, 627 and 629.

FIG. 7 shows a front, right, elevational view of collapsible cargo box 700, with an open tailgate, and certain environmental objects, according to some embodiments. Box 700 may preferably include base 701, back wall 702, left wall 704, right wall 706 and liftgate 708. Liftgate 708 is shown in a flat position.

It should be noted that, in certain embodiments, a collapsible cargo box may preferably include a left wall, a right wall, a rear wall and a base in which one or more of the tongues that couple the bottom of the left wall, the right wall and the rear wall to the base, respectively, may preferably be located on the base, while one or more of the corresponding grooves that engage the tongues may preferably be located on one or more of the bottoms of the left wall, the right wall and the rear wall. As such, one or more of the exemplary tongues and grooves shown in, for example, FIGS. 3 and 5 may preferably be switched such that that one or more of the tongues are located on the base and one or more of the grooves are located on the walls.

Similarly, the tongues on the portions of the walls that engage the grooves in the corner posts may be switched such that the tongues on the portions of the walls are replaced with grooves and the grooves in the corner posts are replaced with tongues.

Thus, methods and apparatus for providing a collapsible cargo box have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. A collapsible cargo box, for mounting on a rear portion of a golf cart, the cargo box comprising:
    a left wall, having a tongue at a bottom of the left wall and having a tongue at a rearmost portion of the left wall;
    a right wall having a tongue at a bottom of the right wall and having a tongue at a rearmost portion of the right wall;
    a back wall having a tongue at a bottom of the back wall, and having a tongue at a leftmost portion of the back wall, and having a tongue at a rightmost portion of the back wall;
    a base, said base comprising:
        a first groove for accommodating the tongue at the bottom of the left wall;
        a second groove for accommodating the tongue at the bottom of the right wall; and
        a third groove for accommodating the tongue at the bottom of the back wall;
    a tailgate, the tailgate having a bottom portion rotatably coupled to the base;
    a left corner post, said left corner post including a first groove for accommodating the tongue at the rearmost portion of the left wall and a second groove for accommodating the tongue at the leftmost portion of the back wall;
    a right corner post, said right corner post including a first groove for accommodating the tongue at the rearmost portion of the right wall and a second groove for accommodating the tongue at the rightmost portion of the back wall;
    a first support and a second support, each of the first and second supports being secured to the base; and
    a first aperture extending through the first support and a second aperture extending through the second support, the first and second apertures for securing the base to the golf cart;
    the left corner post being capped by a removable left post cap secured to the tongue at the rearmost portion of the left wall and secured to the tongue at the leftmost portion of the back wall; and
    the right corner post being capped by a removable right post cap secured to the tongue at the rearmost portion of the right wall and secured to the tongue at the rightmost portion of the back wall; and
    each tongue extending from an attached end to a free end, the free end being wider than the attached end, and each groove including an open slot and a cavity, each groove accommodating the tongue by receiving the free end of the tongue in the cavity of the groove while receiving the attached end of the tongue in the open slot of the groove.

2. The collapsible cargo box of claim 1 wherein the tailgate is rotatably coupled to the base by a plurality of hinges.

3. The collapsible cargo box of claim 1 wherein the tailgate is removably coupled to the base by a plurality of hinges.

4. The collapsible cargo box of claim 1 further comprising a plurality of tailgate locks for locking the tailgate in an upright position.

5. The collapsible cargo box of claim 4 wherein a first of the plurality of tailgate locks is configured to lock a leftmost side of the tailgate to the left wall and a second of the plurality of tailgate locks is configured to lock a rightmost side of the tailgate to the right wall.

6. A collapsible cargo box for mounting on a rear portion of a golf cart, the cargo box comprising:
    a left wall, having a tongue at a rearmost portion of the left wall and a tongue at a bottom of the left wall;
    a right wall having a tongue at a rearmost portion of the right wall and a tongue at a bottom of the right wall;
    a back wall having a tongue at a leftmost portion of the back wall, at a rightmost portion of the back wall and at a bottom of the back wall;
    a base, said base comprising:
        a first groove for accommodating the tongue at the bottom of the left wall;
        a second groove for accommodating the tongue at the bottom of the right wall; and
        a third groove for accommodating the tongue at the bottom of the back wall;
    a tailgate, the tailgate having a bottommost portion rotatably coupled to the base;
    a left corner post, said left corner post including a first groove receiving the tongue at the rearmost portion of the left wall and a second groove receiving the tongue at the leftmost portion of the back wall;
    a right corner post, said right corner post including a first groove receiving the tongue at the rearmost portion of the right wall and a second groove receiving the tongue at the rightmost portion of the back wall;
    a left coupling mechanism, said left coupling mechanism for coupling the left wall and the tailgate;
    a right coupling mechanism, said right coupling mechanism for coupling the right wall and the tailgate;
    a first support and a second support, each of the first and second supports being secured to the base and extending along a width of the base; and
    a first aperture extending through the first support and a second aperture extending through the second support, the first and second apertures for securing the base to the golf cart;
    the left corner post being capped by a removable left post cap secured to the tongue at the rearmost portion of the left wall and secured to the tongue at the leftmost portion of the back wall;
    the right corner post being capped by a removable right post cap secured to the tongue at the rearmost portion of the right wall and secured to the tongue at the rightmost portion of the back wall; and
    each tongue extending from an attached end to a free end, the free end being wider than the attached end, and each groove including an open slot and a cavity, each groove accommodating the tongue by receiving the free end of the tongue in the cavity of the groove while receiving the attached end of the tongue in the open slot of the groove.

7. The collapsible cargo box of claim 6 wherein the tailgate is rotatably coupled to the base by a plurality of hinges.

8. The collapsible cargo box of claim 6 wherein the tailgate is removably coupled to the base by a plurality of hinges.

9. The collapsible cargo box of claim 6 further comprising a plurality of tailgate locks for locking the tailgate in an upright position.

10. The collapsible cargo box of claim 9 wherein a first of the plurality of tailgate locks is configured to lock a leftmost side of the tailgate to the left wall and a second of the plurality of tailgate locks is configured to lock a rightmost side of the tailgate to the right wall.

11. A method for assembling a cargo box for mounting on a rear portion of a golf cart, the cargo box comprising a left wall having a tongue at a rearmost portion of the left wall and a tongue at a bottom of the left wall, a right wall having a tongue at a rearmost portion of the right wall and a tongue at a bottom of the right wall, a back wall having a tongue at a leftmost portion of the back wall, a tongue at a rightmost portion of the back wall and a tongue at a bottom of the back wall, a base comprising a first groove, a second groove and a third groove, a tailgate, a first support and a second support,
 a left corner post, said left corner post including a first groove for receiving the tongue at the rearmost portion of the left wall and a second groove for receiving the tongue at the leftmost portion of the back wall;
 a right corner post, said right corner post including a first groove for receiving the tongue at the rearmost portion of the right wall and a second groove for receiving the tongue at the rightmost portion of the back wall; and
 each tongue extending from an attached end to a free end, the free end being wider than the attached end, and each groove including an open slot and a cavity, each groove being sized and shaped to receive the free end of the tongue in the cavity of the groove while receiving the attached end of the tongue in the open slot of the groove;
the method comprising:
 sliding the tongue at the bottom of the left wall into the first groove in the base;
 sliding the tongue at the bottom of the back wall into the second groove in the base;
 sliding the tongue at the bottom of the right wall into the third groove in the base;
 sliding the tongue at the rearmost portion of the left wall into the first groove in the left corner post;
 sliding the tongue at the leftmost portion of the back wall into the second groove in the left corner post;
 sliding the tongue at the rearmost portion of the right wall into the first groove in the right corner post;
 sliding the tongue at the rightmost portion of the back wall into the second groove in the right corner post;
 capping the left corner post with a removable left post cap by securing the removable left post cap to the tongue at the rearmost portion of the left wall and by securing the removable left post cap to the tongue at the leftmost portion of the back wall; and
 capping the right corner post with a removable right post cap by securing the removable right post cap to the tongue at the rearmost portion of the right wall and by securing the removable right post cap to the tongue at the rightmost portion of the back wall; and
 rotatably coupling the tailgate to the base;
 coupling the left wall and the tailgate using a left coupling mechanism;
 coupling the right wall and the tailgate using a right coupling mechanism; and
 securing the base to the golf cart, the securing including passing a first bolt through an aperture defined by the first support and passing a second bolt through an aperture defined by the second support.

12. The method of claim 11 wherein the securing further comprises passing the first bolt into a first mounting bracket attached to the golf cart and passing the second bolt into a second mounting bracket attached to the golf cart.

\* \* \* \* \*